United States Patent
Kii et al.

(10) Patent No.: US 7,315,869 B2
(45) Date of Patent: Jan. 1, 2008

(54) DATA REPRODUCING APPARATUS, INFORMATION PROCESSING APPARATUS, INFORMATION PROCESSING METHOD, AND COMPUTER PROGRAM

(75) Inventors: Manabu Kii, Tokyo (JP); Masahiro Shimizu, Saitama (JP); Takamichi Hayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 485 days.

(21) Appl. No.: 10/978,919

(22) Filed: Nov. 1, 2004

(65) Prior Publication Data

US 2005/0144181 A1 Jun. 30, 2005

(30) Foreign Application Priority Data

Oct. 30, 2003 (JP) ............................. 2003-369972

(51) Int. Cl.
G06F 17/30 (2006.01)
(52) U.S. Cl. ..................... 707/104.1; 707/2; 707/3; 707/101
(58) Field of Classification Search ................ 707/100, 707/101, 3, 104.1
See application file for complete search history.

(56) References Cited

U.S. PATENT DOCUMENTS

| | | | | |
|---|---|---|---|---|
| 6,434,568 | B1 * | 8/2002 | Bowman-Amuah | 707/103 R |
| 6,529,909 | B1 * | 3/2003 | Bowman-Amuah | 707/10 |
| 6,804,666 | B2 * | 10/2004 | Morita et al. | 707/3 |
| 2002/0147728 | A1 | 10/2002 | Goodman et al. | |
| 2004/0243610 | A1 * | 12/2004 | Ishiguro et al. | 707/100 |
| 2005/0154747 | A1 | 7/2005 | Kii et al. | |

OTHER PUBLICATIONS

Galan Bridgman "Organize Your Media Files Using Windows Media Player", Internet, Jul. 16, 2001; XP002301187.
"Visteon Mach MP3 Music System", Internet, 2001, XP002312654.

* cited by examiner

Primary Examiner—Jean M. Corrielus
Assistant Examiner—Noosha Arjomandi
(74) Attorney, Agent, or Firm—Wolf, Greenfield & Sacks, P.C.

(57) ABSTRACT

The present invention provides a configuration that verifies erased contents at a check-out destination efficiently and properly. A portable device or other apparatus at a contents check-out destination retains an erased contents management file, which registers contents identification information corresponding to check-out contents erased in the portable device or the like. A personal computer at a contents check-out source performs an erased contents verification process in accordance with the information registered in the erased contents management file and performs an update process (check-in process) on a check-out counter for contents whose erasure has been verified. Even if a large amount of check-out contents exists, the present invention can efficiently perform an erased contents verification process and check-in process.

17 Claims, 9 Drawing Sheets

DATA REPRODUCING APPARATUS, INFORMATION PROCESSING APPARATUS, INFORMATION PROCESSING METHOD, AND COMPUTER PROGRAM

BACKGROUND OF THE INVENTION

The present invention relates to a data reproducing apparatus, information processing apparatus, information processing method, and computer program. More particularly the invention relates to a data reproducing apparatus, information processing apparatus, information processing method, and computer program that are used in a contents management configuration, in which use limitations are defined, to perform a check-out for moving contents between information processing apparatuses and exercise efficient check-out/check-in management in a situation where contents are erased at a check-out destination.

As regards music data, image data, game programs, and other similar contents that are reproduced or used in a personal computer, reproducing apparatus, or other information processing apparatus, their creators and sellers generally own the copyright or distribution right for such data. Therefore, such contents are ordinarily used under the control of a contents management program that predefines a use limit to prevent the contents from being reproduced, duplicated, or manipulated without permission.

In recent years, particularly, recording apparatuses and recording media for recording information in digital form have been used widely. A digital recording technology makes it possible to record, duplicate, and reproduce video and audio data without degrading its quality. If, under these circumstances, recording media on which illegally copied contents are stored are distributed in the market, the profits of persons holding the copyrights of music, movie, and various other contents or persons having the rights to sell them will be diminished. Recently, various processing configurations have been worked out or proposed for use with digital recording apparatuses and recording media to prevent digital data from being illegally copied.

For example, the SDMI (Secure Digital Music Initiative), which proposes various music distribution technology specifications, has proposed a copyright protection standard for portable reproducing apparatuses. Various copyright protection schemes are proposed, including a limitation on the number of copies of contents, a limitation on the period of contents use, and check-out/check-in management, which will be described later.

Contents downloaded via a network by a user who performs a proper procedure and contents stored on a DVD or other recording medium can be reproduced on a personal computer or other information processing apparatus that is capable of reproducing contents. If an SDMI-defined limitation is imposed on the use of such contents, the personal computer or other information processing apparatus performs a contents use control process in accordance with an LCM (Licensed Compliant Module) or other software module compliant with the SDMI standard.

The LCM is a set of modules that exercise control to permit the use of individual contents only when the use conditions imposed by a copyright holder or other similar person are met. This LCM control is exercised to prevent copyrights from being infringed mainly by illegal secondary use of contents. Contents use conditions subject to control include contents reproduction conditions, copy conditions, move conditions, or storage conditions.

As an LCM-based contents use control process, check-out/check-in management is exercised to perform a process for managing the contents output to an external device and the contents input from the external device.

In a configuration for outputting contents targeted for management from a personal computer (PC) or other information processing apparatus, which performs a contents use management process, to portable devices (PDs) or other data reproducing apparatuses, which input the contents targeted for management as check-out contents, and allowing the portable devices to reproduce or use the contents, check-out/check-in management is exercised to provide contents use management by limiting the number of portable devices to which a set of contents can be output.

The outline of a check-out/check-in process and the configuration for enhancing the efficiency of a process for designating the contents to be checked out are disclosed, for instance, by Patent Document 1 (Japanese Patent Laid-Open No. 2001-175624). The configuration for acquiring check-out contents information from a portable device and making it possible to check out optimally selected contents is disclosed by Patent Document 2 (Japanese Patent Laid-Open No. 2003-77214).

When a check-out process is to be performed, the LCM of a personal computer that stores contents, for instance, on its hard disk performs authentication to check whether a portable device connected to the personal computer is authenticated. When the connected portable device is authenticated, the LCM performs an encryption or other similar process, transfers the contents, and if necessary, performs a process for transferring contents use rights information.

After performing a contents check-out process on the portable device, the LCM of the personal computer updates the contents use rights information (use conditions) about the checked-out contents. More specifically, the LCM decrements the permissible check-out count for the check-out contents by one. If, for instance, the maximum value for the permissible check-out count managed by the LCM of the personal computer is 3, the counter for keeping the permissible check-out count is decremented by one each time a check-out process is performed. As a result, the permissible check-out count is sequentially changed from 3 to 2, 1, and 0. When a permissible check-out count of 0 is reached, the associated contents cannot be checked out any more.

The portable device stores the check-out contents, which are input from the personal computer, and contents use rights information or the like on a flash memory or other recording medium. Thus, the portable device can reproduce or use the contents in accordance with the contents use rights information.

The contents checked out to the portable device can be returned to the personal computer's hard disk. The process for returning contents from the portable device to the personal computer is called a check-in process.

When a check-in is performed, the personal computer increments the permissible check-out count (counter) that is managed by the LCM. In other words, when contents are returned (checked in) from the portable device that has checked out the contents, the personal computer increments the counter by one. More specifically, the personal computer's contents counter is incremented by one upon each check-in so that the resulting count sequentially changes from 0 to 1, 2, and 3. As a result, the contents can be checked out repeatedly in accordance with an increase in the count.

At the time of a check-in process, the personal computer checks whether it performed a contents check-out for a portable device that requested a check-in process. The personal computer performs a check-in process only when a contents check-in process request is issued by a portable device for which the personal computer performed a check-out. If a portable device stores contents that are checked out from another personal computer, the check-in process will not be performed for such contents. For contents identification purposes, the personal computer acquires the device ID of a portable device for which a check-out is to be performed, associates the acquired device ID with check-out contents, and stores it in the personal computer's memory.

When the device ID is associated with contents and stored in the personal computer, a "virtual check-in process" can be performed as described below. If, for instance, contents checked out to a portable device from the personal computer are erased while the portable device is away from home, the personal computer detects when the portable device is connected to the personal computer that the checked-out contents are erased from the portable device. Further, when it is verified that a check-in process is not performed by the portable device, it is concluded that a check-in process is virtually performed. The counter for erased contents is then incremented by one. Due to this virtual check-in, the counter can be reset (incremented) even if checked-out contents are erased outside.

When the above virtual check-in process is to be performed, the personal computer performs a process for determining whether contents it checked out are erased from the portable device. In this instance, a targeted contents identifier is searched for. If the portable device has a small capacity and the amount of stored contents is small, the time required for the search does not constitute any problem. However, if the portable device has a hard disk or large-capacity flash memory, it stores a large amount of contents. In such a situation, it takes a considerable amount of time to search a large amount of contents for target contents.

To update the contents rights information of the personal computer's LCM (that is, to increment the permissible check-out count by one) in a situation where contents are erased by the portable device, it is necessary to perform a process for determining the contents ID that serves as the contents identifier corresponding to the erased contents.

The contents ID corresponding to the contents checked out by the portable device is recorded in a TOC (Table of Contents) file, which defines, for instance, the order of contents reproduction. Alternatively, the contents ID is recorded in a contents file, which stores contents.

If the portable device uses a TOC file for contents ID management purposes, the personal computer's LCM performs a process for verifying a contents ID that is registered in the portable device's TOC file. If a contents ID corresponding to checked-out contents is erased from the portable device's TOC file, the process verifies that the contents are erased.

However, if an enormous amount of data is stored in file form in the portable device, an enormous number of IDs are registered in the TOC file. It is therefore necessary to perform a process on an enormous amount of data to check for an ID corresponding to erased contents. It means that it is necessary to repeatedly perform a process on all contents IDs to check whether a contents ID corresponding to locally checked-out contents is registered in the portable device's TOC file. This causes a problem because the processing efficiency decreases with an increase in the number of check-out contents.

Further, contents IDs managed by the TOC file are not always erased when the portable device performs a contents erasure process. There is a problem with the fact that contents erasure can be verified only by conducting an ID search in the TOC file.

In a situation where the portable device uses contents storage files for contents ID management purposes, the personal computer's LCM must check all file names on the portable device to determine whether a file name corresponding to an erased contents ID exists. The efficiency of such a file search process is lowered if an enormous amount of data is stored in file form in the portable device.

As described above, if any contents are erased in a portable device after being checked out from a personal computer to the portable device in a situation where the portable device has a large-capacity recording medium and a large amount of check-out contents, a large amount of data needs to be searched within an erased contents verification process performed by the personal computer. As a result, the processing efficiency is decreased.

SUMMARY OF THE INVENTION

The present invention has been made in view of the above circumstances. It is an object of the present invention to provide a data reproducing apparatus, information processing apparatus, information processing method, and computer program for performing an erasure verification process properly and efficiently and exercising appropriate contents use management if check-out contents are erased at a check-out destination.

According to the first aspect of the present invention, there is provided a data reproducing apparatus including:

a communication unit for transmitting contents to and receiving contents from an external device;

a storage unit for storing a plurality of contents;

a reproduction unit for reproducing contents; and a control unit for determining whether or not erased contents are contents transferred from an external device, and storing, if it is determined that the erased contents are contents transferred from the outside, identification information about the contents transferred from the external device as erased contents identification information.

According to the second aspect of the present invention, there is provided an information processing apparatus including:

a storage unit for storing, in a corresponding relationship, a plurality of contents, identification information about each contents, and use management information indicating the use of each contents;

a transmission unit for transmitting contents to an external device;

a reception unit for receiving erased contents identification information about contents erased by the external device; and an information processing unit for causing, if the reception unit receives the erased contents identification information, the storage unit to retrieve identification information that matches the erased contents identification information, and updating use management data corresponding to the retrieved identification information.

According to the third aspect of the present invention, there is provided a contents management system including:

an information processing apparatus for managing the use of contents; and a data reproducing apparatus for receiving contents from the information processing apparatus, wherein the data reproducing apparatus includes:

a communication unit for transmitting contents to and receiving contents from the information processing apparatus;

a storage unit for storing a plurality of contents; and a control unit for determining whether or not erased contents are contents transferred from the information processing apparatus, and storing, if it is determined that the erased contents are contents transferred from the information processing apparatus, identification information about the contents transferred from the information processing apparatus as erased contents identification information; and wherein the information processing apparatus includes:

a storage unit for storing, in a corresponding relationship, a plurality of contents, identification information about each contents, and use management information indicating the use of each contents;

a transmission unit for transmitting contents to the data reproducing apparatus;

a reception unit for receiving the erased contents identification information from the external device; and an information processing unit for causing, if the reception unit receives the erased contents identification information, the storage unit to retrieve identification information that matches the erased contents identification information, and updating use management data corresponding to the retrieved identification information.

According to the fourth aspect of the present invention, there is provided an information processing method for use in an information processing apparatus that is capable of receiving contents transferred from an external device, the information processing method including the steps of:

erasing contents;

determining whether or not erased contents are contents transferred from an external device; and storing, if it is determined that the erased contents are contents transferred from the outside, identification information about the contents transferred from the external device as erased contents identification information.

According to the fifth aspect of the present invention, there is provided an information processing method for use in an information processing apparatus that is capable of managing the use of contents and communicating with an external device, the information processing method including the steps of:

storing, in a corresponding relationship, a plurality of contents, identification information about each contents, and use management information indicating the use of each contents;

receiving erased contents identification information about contents erased in the external device from the external device;

retrieving, if the erased contents identification information is received, identification information that matches the erased contents identification information; and updating use management information corresponding to the retrieved identification information.

According to the sixth aspect of the present invention, there is provided a computer program for use in an information processing apparatus that is capable of receiving contents transferred from an external device, the computer program including the steps of:

erasing contents;

determining whether or not erased contents are contents transferred from an external device; and storing, if it is determined that the erased contents are contents transferred from the outside, identification information about the contents transferred from the external device as erased contents identification information.

According to the seventh aspect of the present invention, there is provided a computer program for use in an information processing apparatus that is capable of managing the use of contents and communicating with an external device, the computer program including the steps of:

storing, in a corresponding relationship, a plurality of contents, identification information about each contents, and use management information indicating the use of each contents;

receiving erased contents identification information about contents erased in the external device from the external device;

retrieving, if the erased contents identification information is received, identification information that matches the erased contents identification information; and updating use management information corresponding to the retrieved identification information.

According to the configuration of the present invention, the data reproducing apparatus generates the erased contents management file (check-in indicator file) that registers the contents identification information about check-out contents erased in the data reproducing apparatus, which is a contents check-out destination, updates it, and stores it in a storage section, as described above. The personal computer, which is a contents check-out source, acquires the registration information in the erased contents management file (check-in indicator file) from the portable device, performs an erased contents verification process in accordance with the acquired information, and performs an update process (check-in process) on the check-out counter for contents whose erasure has been verified. Therefore, even if a large amount of check-out contents exists, the erased contents verification and check-in processes can be efficiently performed without having to perform an erased contents verification process by searching the entire check-out contents. As a result, when the present invention is applied to a configuration in which contents are output (checked out) to a portable device having a flash memory or hard disk that is capable of storing a large amount of data, high processing efficiency is achieved by erasing contents promptly.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Figure 1:
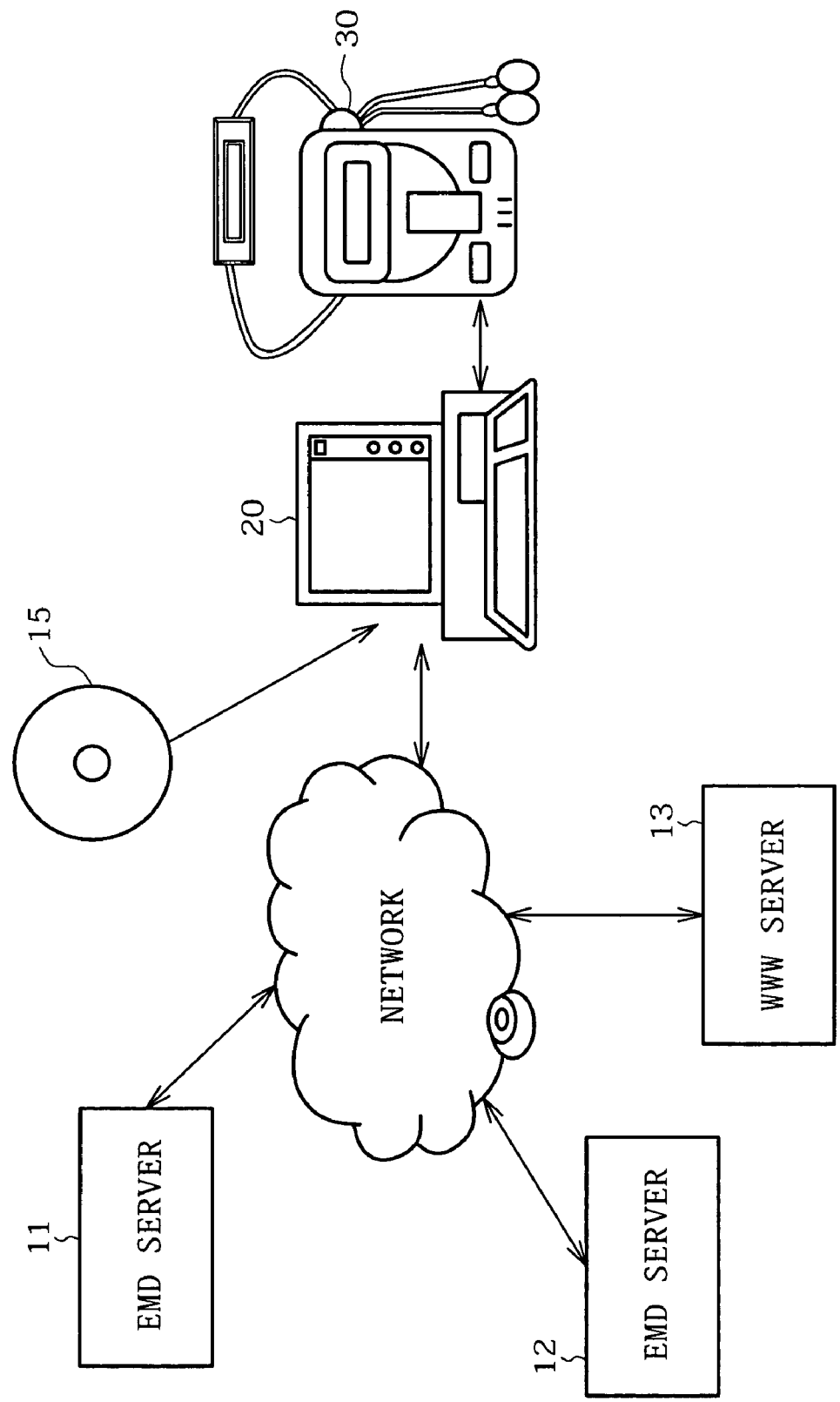
FIG. 1 illustrates a typical contents use configuration according to the present invention.

First of all, a typical use of contents including a check-out/check-in process and check-out/check-in management process will be described. FIG. 1 shows a typical form of contents use to which the present invention is applicable. In compliance with a request from a personal computer (PC) 20, EMD (Electrical Music Distribution) servers 11, 12, which are provided as dedicated music distribution servers, and a WWW (World Wide Web) server 13 supplies contents and incidental data (e.g., song title and use rights information) to the personal computer 20, which serves as an information processing apparatus, via a network configured by, for instance, a local area network or the Internet.

Further, a CD, DVD, MD, or other recording medium 15 on which contents are recorded is set in the personal computer 20. The contents and incidental data (e.g., song title and use rights information) stored on the recording medium are supplied to the personal computer 20. The contents supplied from the EMD servers 11, 12 and WWW server 13 and the contents stored on the recording medium 15 are compressed and encrypted as needed.

The personal computer 20 records contents data received via the network or read from the recording medium onto a recording medium (e.g., hard disk) within the personal computer. Contents-specific contents use rights information is attached to the contents data so that the personal computer 20 records both the contents and contents use rights information.

The contents use rights information includes use period limiting conditions, copy count limit, and various other items of rights information. One item of the contents use rights information is the information that limits the number of outputs, for instance, to a portable device (PD) 30, that is, the information for limiting the check-out count.

The personal computer 20 can output contents to a portable device 30, which serves as a data reproducing apparatus, or other external device. The personal computer 20 counts the number of contents outputs (check-outs) and permits contents outputs (check-outs) until the maximum check-out count, which is set within the contents use rights information, is reached. The personal computer 20 does not permit check-outs if the maximum check-out count is exceeded. An LCM (Licensed Compliant Module), which is an SDMI (Secure Digital Music Initiative) compliant software module, performs a contents input/output management process within the personal computer 20.

The portable device 30, which serves as a data reproducing apparatus, includes a flash memory, small-size hard disk, optical disk, magneto-optical disk, or other recording medium. The portable device 30 uses such a recording medium to store contents, song titles, use rights information, and other incidental data, which are supplied when the personal computer 20 performs a check-out process. In accordance with contents use rights information, the portable device 30 reproduces the contents stored on the recording medium, and outputs the contents via a headphone, speaker, or other output means.

A contents input/output process, that is, a check-out/check-in process, which is performed between the personal computer and portable device having a recording medium for storing contents, will now be described in detail.

In accordance with contents-specific contents use rights information, a check-out/check-in management program contained in the LCM, which is an SDMI-compliant software module, performs a check-out process for controlling and managing the output of the contents stored on the personal computer's hard disk or other data storage means to the portable device or other external device, and performs a check-in process for controlling and managing the return of contents checked out to the portable device or other external device to the personal computer.

Figure 2:
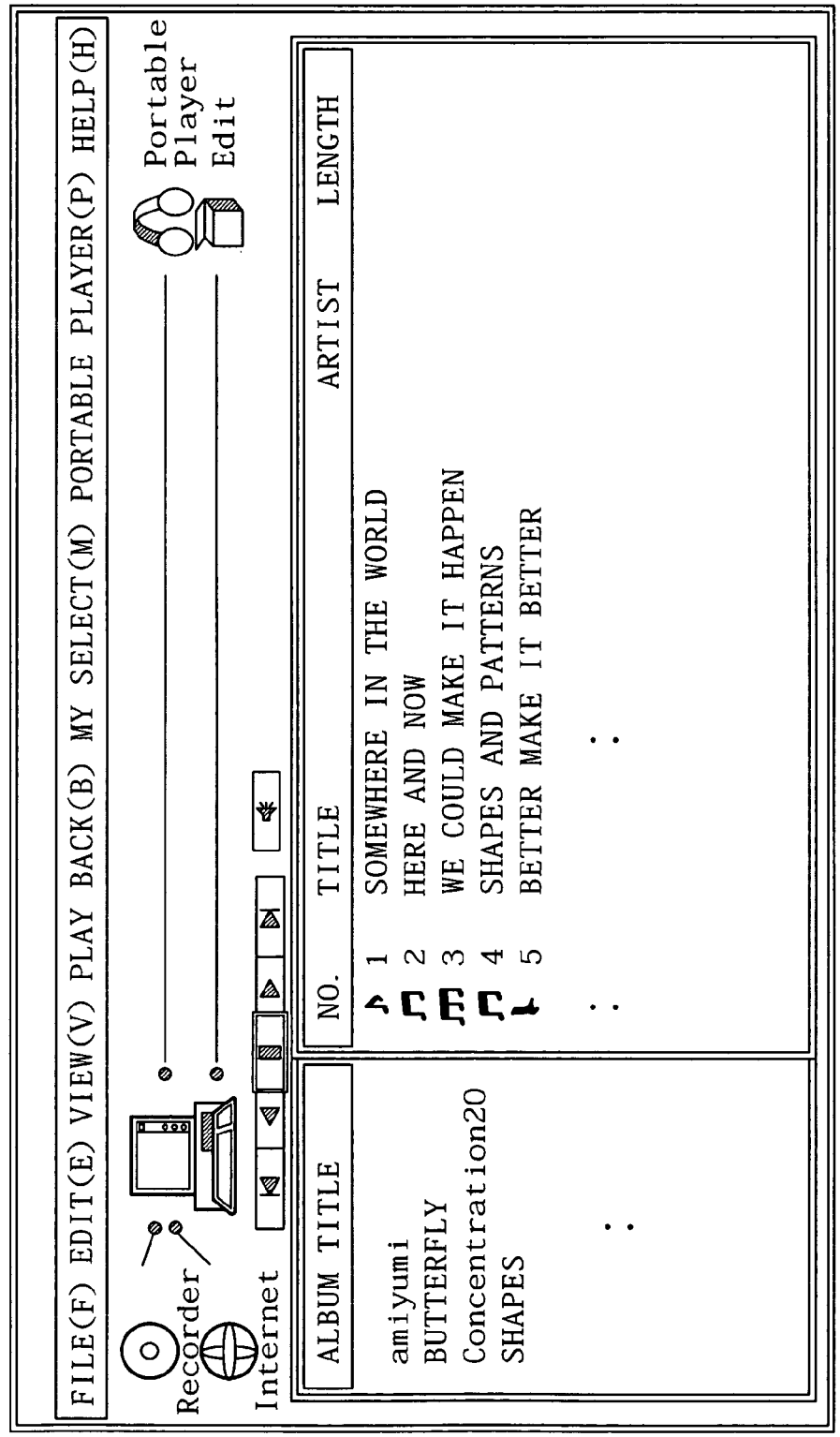
FIG. 2 shows a typical window that appears on a personal computer when it performs a contents check-out process.

In a contents check-out process or check-in process, the check-out/check-in management program updates a permissible check-out counter, which is variously set in accordance with contents. FIG. 2 shows a typical check-out/check-in operation instruction window that appears on the personal computer's display.

An album title, song title, artist name, and other contents-related data about a check-out/check-in process target appear on the personal computer's display. The "No." field shown in the figure presents an identification number for a song title and a musical note, which indicates the current permissible check-out count.

When there is one musical note in the "No." field shown in FIG. 2, it means that one check-out process can be performed. There is one musical note for the No. 1 song, which is named "SOMEWHERE IN THE WORLD". For this song, one more contents transfer process can be performed from the personal computer to the portable device. The No. 2 song, which is named "HERE AND NOW" and provided with two musical notes, can be checked out two more times. For the No. 2 song, therefore, two more contents transfer process can be performed from the personal computer to the portable device. The No. 3 song, which is named "WE COULD MAKE IT HAPPEN" and provided with three musical notes, can be checked out three more times. As regards the No. 5 song, which is named "BETTER MAKE IT BETTER" and provided with a musical rest instead of a note, no more contents check-out process can be performed. It means that the permissible check-out count is reset to 0 because the maximum permissible check-out count is reached.

The personal computer stores contents and contents-related data (e.g., song title or contents use rights information such as reproduction conditions) on a recording medium within a portable device that is connected to the personal computer via an USB (Universal Serial Bus) cable. In such a check-out process, the personal computer updates a check-out counter for the contents stored in the portable device. The value of the counter corresponds to the number of musical notes shown in FIG. 2. When the check-out process is performed, the counter corresponding to the contents recorded in the personal computer is decremented by one. It means that the permissible check-out count is decremented by one. When a check-out count of 0 is reached, the associated contents cannot be checked out anymore.

When the counter for setting the permissible check-out count for contents to be checked out from the personal computer is set as contents-specific use rights information as described above, it is possible to prevent a piece of contents from being copied from the personal computer to an infinite number of recording media. If, for instance, the maximum permissible check-out count is 3, the counter for contents stored on the personal computer's hard disk is set to 3. This setting permits the contents to be copied from the personal computer to up to three recording media, but prevents a copy process from being performed more than three times.

Whenever a process is performed to transfer contents from the personal computer to a portable device, which serves as an information recording processing apparatus, that is, whenever a check-out process is performed, the personal computer's contents-specific counter is sequentially updated from 3 to 2, 1, and 0. When a count of 0 is reached, the associated contents cannot be transferred (checked out) from the personal computer.

Contents checked out to the portable device and stored on a hard disk or optical disk or in a flash memory or other storage device can be returned to the personal computer's hard disk. The process for returning contents from the portable device to the personal computer in the above manner is called a check-in process.

When the check-in process described above is performed, the counter corresponding to the contents stored on the personal computer's hard disk is incremented. In other words, when the contents are returned (checked in) from a portable device that checked out the contents, the personal computer increments the counter. Whenever a check-in process is performed, the personal computer updates its contents-specific counter from 0 to 1, 2, and 3. Therefore, the contents can be checked out repeatedly in accordance with an increase in the counter.

During a check-in process, the personal computer determines whether or not it checked out contents to a portable device that has requested the check-in process. The personal computer performs a check-in process only when it checked out contents to a portable device that has issued a request for the check-in process. In other words, the personal computer does not perform a check-in process for contents stored in a portable device if the contents were checked out from another personal computer. For contents identification purposes, the personal computer acquires the device ID of a portable device that checks out contents, associates the acquired device ID with the checked-out contents, and stores the resulting association in the personal computer's memory.

When the device ID described above is associated with contents and stored in the personal computer, a "virtual check-in process" can be performed as described below. If, for instance, contents checked out to a portable device from the personal computer are erased while the portable device is away from home, the personal computer detects that the checked-out contents are erased from the portable device by connecting the portable device to the personal computer via, for example, an USB cable. Further, when it is verified that a check-in process is not performed by the portable device, it is concluded that a check-in process is virtually performed. The counter for erased contents is then incremented by one. Due to this virtual check-in, the counter can be reset (incremented) even if checked-out contents are erased outside.

When the above virtual check-in process is to be performed, the personal computer performs a process for determining whether or not contents it checked out are erased from the portable device. In this instance, a targeted contents identifier, that is, a contents ID, is searched for. If the portable device has a small capacity and the amount of stored contents is small, the time required for the search does not constitute any problem. However, if, for instance, a small-size hard disk is used as a portable device, the hard disk stores a large amount of contents. In such a situation, it takes a considerable amount of time to search a large amount of contents for target contents.

Even if contents are checked out to a portable device having a large-capacity recording medium such as a hard disk, optical disk, magneto-optical disk, or large-capacity flash memory, the configuration according to the present invention enables the personal computer to search for a target contents identifier with ease and determine whether or not target contents exist.

Figure 3:
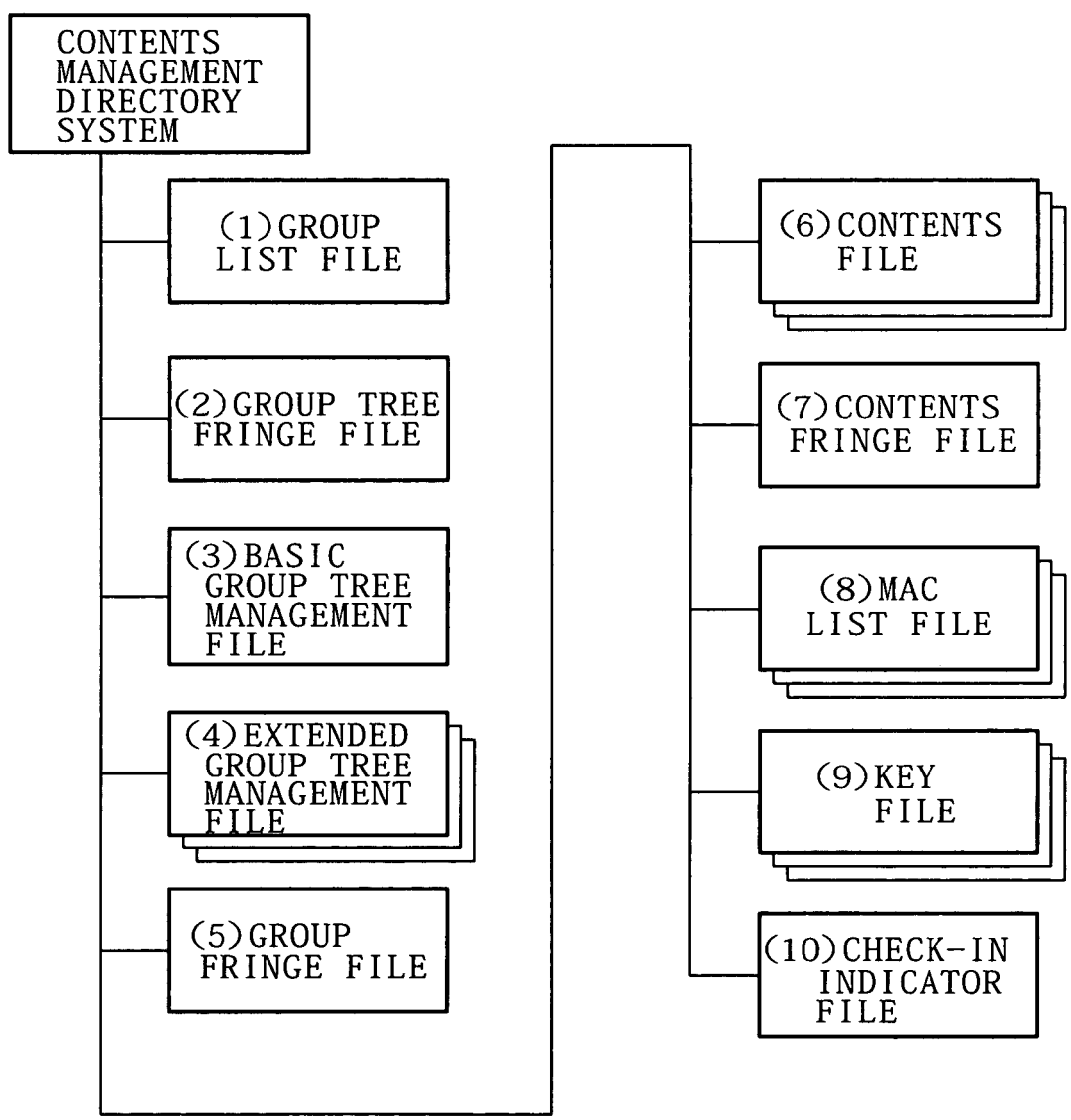
FIG. 3 shows a typical contents management directory system configuration that is set for contents management in a portable device, which serves a contents check-out destination.

FIG. 3 shows a contents management configuration according to the present invention, that is, the configuration of files checked out by a portable device or other data reproducing apparatus for entering contents by performing a check-out.

The portable device, which stores contents checked out from the personal computer, manages check-out contents in accordance with a contents management system directory shown in FIG. 3.

The files constituting the contents management system directory shown in FIG. 3 are enumerated and described below:

(1) Group List File
File for listing playlists that exist on the system.

(2) Group Tree Fringe File
File for storing fringe data (attribute data), which includes titles and other items of attribute information about playlists.

(3) Basic Group Tree Management File
TOC (Table of Contents) file for storing a default playlist and defining the order of contents reproduction.

(4) Extended Group Tree Management File
File for storing a playlist that defines the order of track (contents) reproduction, which is different from the default one.

(5) Group Fringe File
File for storing fringe data (attribute data) for groups that are defined in various group trees.

(6) Contents File
File for storing contents data.

(7) Contents Fringe File
File for storing fringe data (attribute data) for contents.

(8) MAC List File
File for storing a MAC (Message Authentication Code), which serves as a hash value for use in a rights information falsification check of contents.

(9) Key File
File for storing a key for encrypting/decrypting contents.

(10) Check-In Indicator File
Erased contents management file for recording the contents ID and file number of a track that is erased in the portable device.

When the portable device erases contents that were checked out and entered from the personal computer, the check-in indicator file shown in FIG. 3, that is, the erased contents management file, is updated so that the check-in indicator file stores contents erasure information.

When the portable device serving as a data reproducing apparatus inputs contents targeted for management as check-out contents from the personal computer serving as an information processing apparatus for performing a contents use management process, the aforementioned contents management directory system is set to manage the check-out contents.

When the check-out contents are erased in the portable device, the erased contents management file in which contents identification information about erased contents is set as a data entry, that is, the check-in indicator file, is generated or updated. The portable device serving as a data reproducing apparatus stores the check-in indicator file and various other contents management data files contained in the directory shown in FIG. 3 in the storage means.

Figure 4:
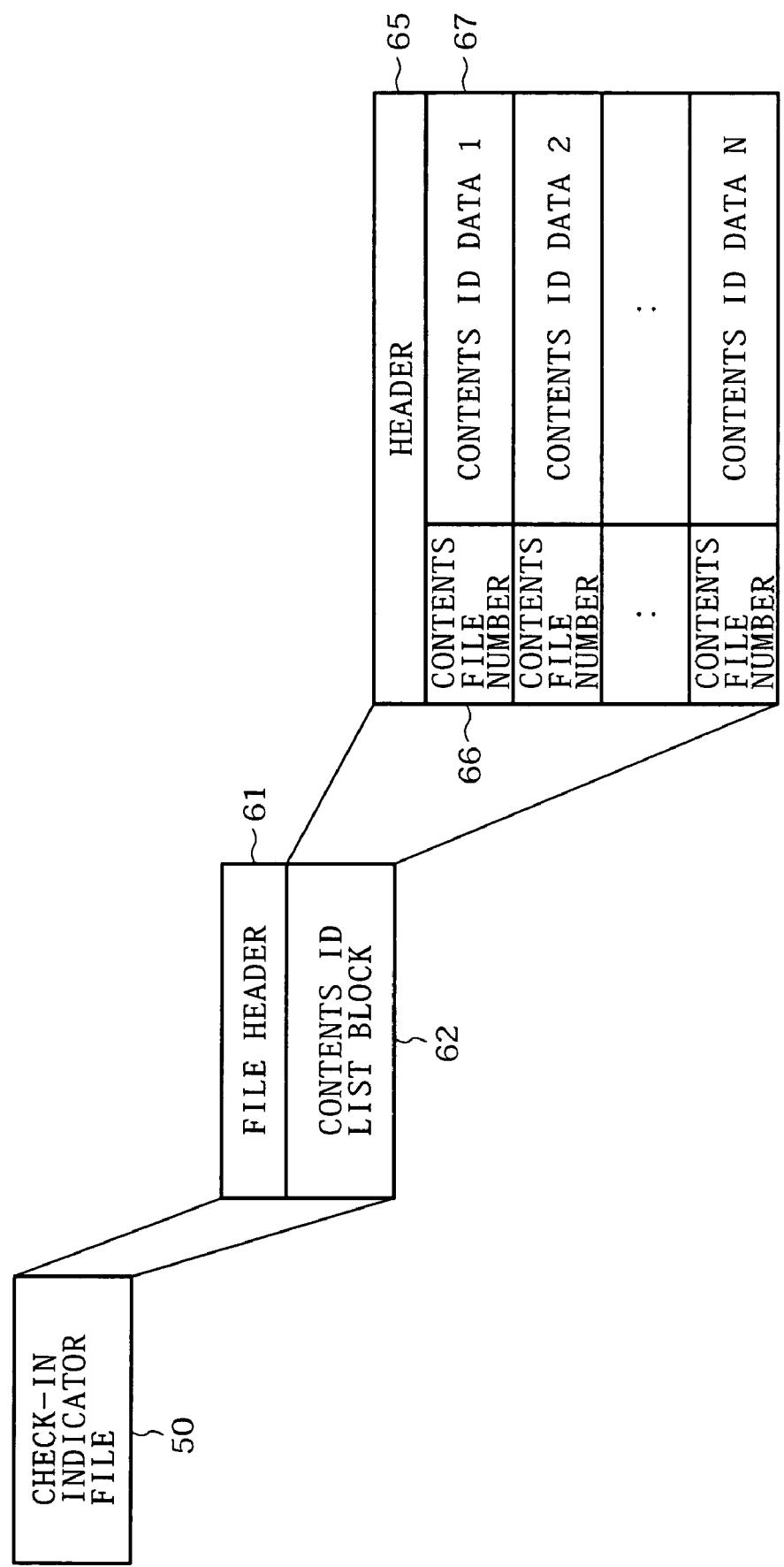
FIG. 4 illustrates the structure of a check-in indicator file, which is used as an erased contents management file for a contents management directory system.

The structure of the check-in indicator file will now be described with reference to FIG. 4. As shown in FIG. 4, the check-in indicator file 50 includes a file header 61 and a contents ID list block 62.

The contents ID list block includes a header 65 and a contents ID list. The contents ID list, which is a pair of data, includes a contents file number 66 and contents ID data 67.

The contents file numbers and contents ID data corresponding to contents erased in the portable device are sequentially recorded in the contents ID list block. The contents file number is a file identification number that is set, for instance, for check-out contents as a sequential number when the check-out contents are checked out from the personal computer to the portable device. The contents ID is a contents-specific identifier that is assigned to contents.

When the personal computer performs a check-out process in relation to the portable device, the personal computer sets a file number for check-out contents and outputs the contents and file number to the portable device. The contents ID is preset for contents as incidental data, and transferred from the personal computer to the portable device at the time of contents output.

When contents checked out from the personal computer and entered into the portable device are erased, the portable device performs a process for adding a file number and contents ID for the erased contents to the check-in indicator file as a data entry. This entry addition process for the check-in indicator file is automatically performed when the user performs a contents erasure process.

Figure 5:
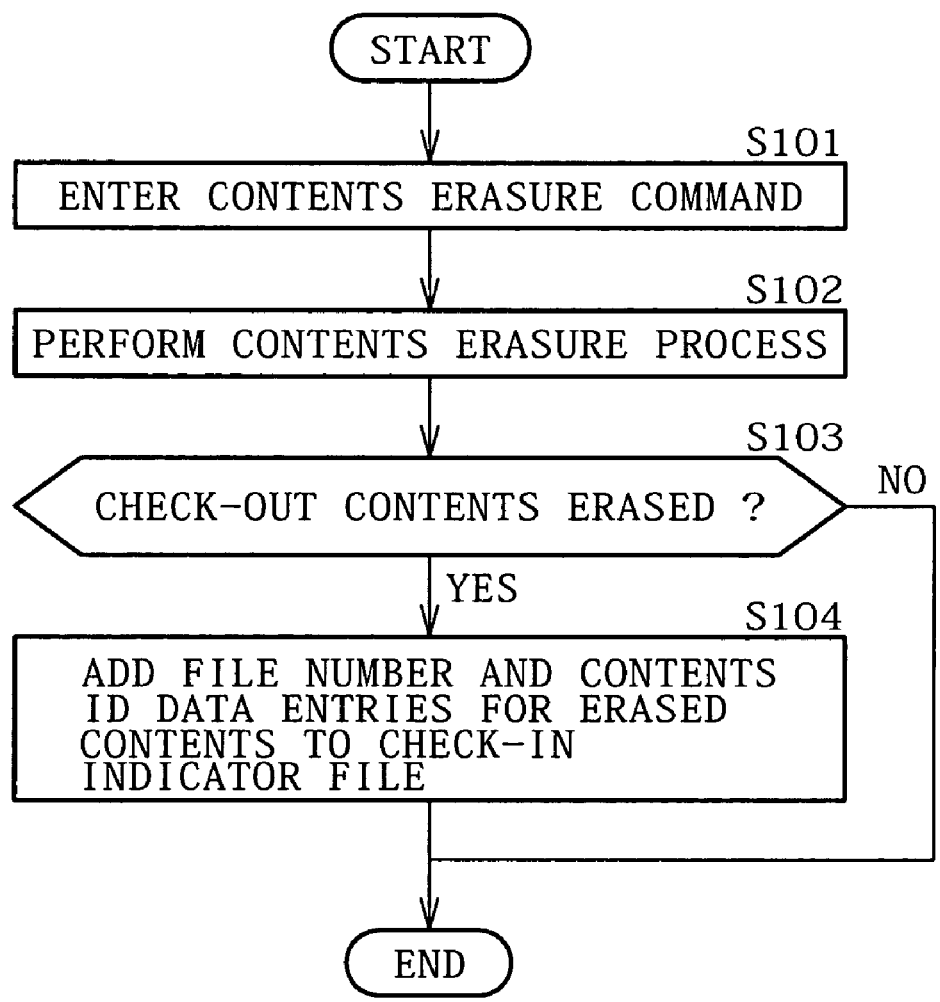
FIG. 5 is a flowchart illustrating a contents erase and check-in indicator file update sequence that is executed by a portable device, which serves a contents check-out destination.

FIG. 5 is a flowchart illustrating the sequence of a contents erasure process that is performed by the portable device. Individual contents erasure process steps will now be described.

When step S101 is performed to enter a contents erasure command in compliance, for instance, with user instructions, step S102 is followed to perform an erasure process for contents designated for erasure.

Step S103 is then performed to determine whether or not the erased contents are checked-out contents. This determination is formulated by determining whether or not the contents are targeted for management by the contents management directory system, which is described with reference to FIG. 3. For example, the determination can be formulated by checking whether or not the associated contents file is erased in the contents management directory system or by viewing the other contents management file within the contents management directory system.

If the erased contents are not checked-out contents, the process terminates after only a contents erasure operation is performed. If, on the other hand, the erased contents are checked-out contents, step S104 is performed to add a file number and contents ID corresponding to the erased contents to the check-in indicator file as a new entry.

When the portable device is connected to the personal computer after check-out contents are erased by the portable device, the personal computer's LCM references an indicator in the portable device's check-in indicator file and performs a contents management file update. In other words, when an erasure operation performed by the portable device is verified, the LCM performs a process for incrementing the check-out counter for the contents by one.

A contents management table, which is set by the personal computer's LCM and applied to check-out/check-in management, will now be described with reference to FIG. 6.

Figure 6:
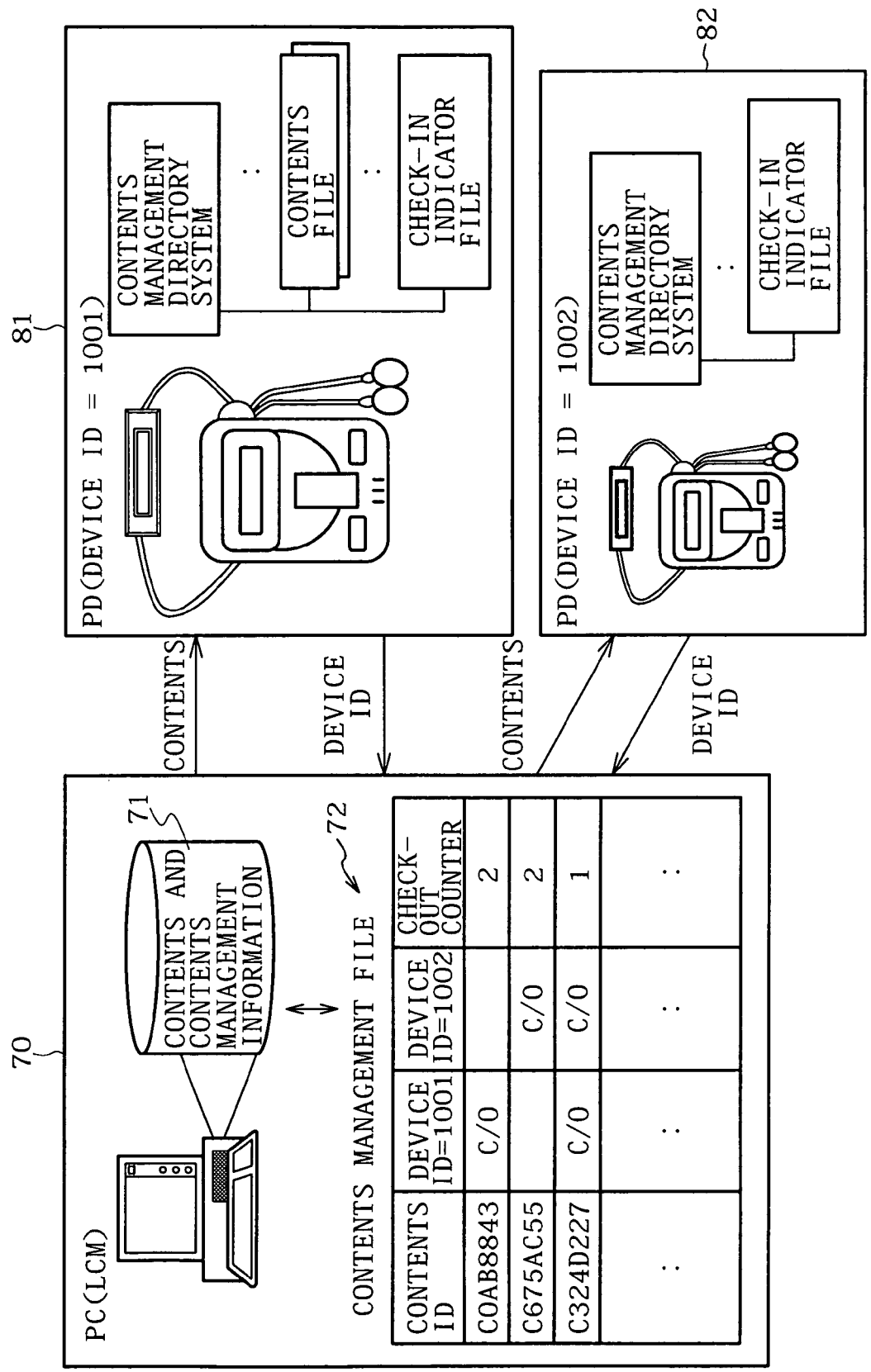
FIG. 6 illustrates data that are managed by a personal computer and portable device during a contents check-out process.

As shown in FIG. 6, the personal computer 70 includes a hard disk or other storage means 71, which stores contents and contents management information. A contents management table 72 is contained as part of the contents management information and used as a table for check-out/check-in management.

The contents management table 72 stores data, which defines the association among the contents ID of checked-out (C/O) contents, a portable device ID, and a check-out counter.

When the personal computer 70 checks out contents to a portable device 81 or portable device 82, the personal computer 70 performs a predetermined authentication process. The personal computer 70 registers the identifier (device ID) of the portable device 81 or 82 and checks out the contents only when the authentication process is successfully completed.

Each time a check-out is performed, the check-out counter, which is set in the contents management table, is sequentially decremented from 3 to 2, 1, and 0. When a permissible check-out count of 0 is reached, the contents can no longer be checked out.

The portable device 81 or 82 stores the checked-out contents, which is input from the personal computer 70, and other relevant information such as contents use rights information into a flash memory or other recording medium. Portable device 81 or 82 can then reproduce or otherwise use the contents in accordance with the contents use rights information. Portable device 81 or 82 sets up the contents management directory system, which has been described with reference to FIG. 3, and manages the check-out contents.

The contents management directory system includes the check-in indicator file, which is used to register the file numbers and contents IDs of contents erased in the portable device.

When the portable device is connected to the personal computer, the personal computer's LCM references the portable device's check-in indicator file. When the LCM verifies contents erased by the portable device, the check-out counter for the erased contents, which is registered in the contents management file 72, is incremented by one.

The sequence of a check-in process will now be described with reference to FIG. 7. The LCM performs this process in which an indicator in the portable device's check-in indicator file is referenced to perform a counter update.

In step S201, the portable device is connected to the personal computer. The connection is established, for instance, via an USB, IEEE1394, or other interface.

In step S202, an authentication process is performed between the portable device and personal computer. The authentication process is performed to establish the authenticity of each other. Mutual authentication protocols applicable to the present invention include the ISO/IEC 9798-2 or other protocol that uses a common key cryptosystem, the ISO/IEC 9798-3 or other protocol that uses a public key cryptosystem, and the ISO/IEC 9798-4 or other protocol that uses MACs (Message Authentication Codes).

If the authentication process is not successfully completed in step S202 (if query step S203 is answered "No"), step S210 is followed to abort the process so that the process terminates without performing any subsequent processing step. If, on the other hand, the authentication process is successfully completed in step S202 (if query step S203 is answered "Yes") to verify that the connected device is authentic, the program flow proceeds to step S204.

In step S204, the personal computer's LCM checks whether the contents use rights information, which was output together with contents when the contents were checked out to the portable device, is falsified.

As the contents use rights information, a MAC or other falsification check value based on contents use condition description data is generated by the personal computer's private key. The personal computer's LCM enters the contents use rights information from the portable device and conducts a MAC check to check for falsification.

If it is found that the contents use rights information is falsified (if query step S205 is answered "Yes"), step S210 is followed to abort the process so that the process terminates without performing any subsequent processing step. If, on the other hand, it is found that the contents use rights information is not falsified (if query step S205 is answered "No"), step S206 is performed to search the portable device's contents management directory system (see FIG. 3) for the check-in indicator file.

The portable device presents the registration information about the check-in indicator file to the personal computer only when the authentication process is successfully completed between the personal computer and portable device and it is verified that the contents use rights information owned by the portable device is not falsified. The personal computer then performs an erased contents verification process in accordance with the registration information about the check-in indicator file owned by the portable device.

If the personal computer cannot acquire the check-in indicator file from the portable device's contents management directory system (if query step S207 is answered "No"), step S210 is followed to abort the process so that the process terminates without performing any subsequent processing step. If, on the other hand, the check-in indicator file is verified and acquired (if query step S207 is answered "Yes"), step S208 is performed to determine whether or not the information about the contents managed by the personal computer's LCM, that is, the contents ID, is recorded in the check-in indicator file. This determination process is performed to check whether or not a contents ID registered in the check-in indicator file coincides with a contents ID recorded in the contents management table, which has been described with reference, for instance, to FIG. 6.

If the contents ID managed by the personal computer's LCM is not registered in the check-in indicator file (if query step S208 is answered "No"), step S210 is followed to abort the process so that the process terminates without performing any subsequent processing step. If, on the other hand, the check-in indicator file is verified (if query step S208 is answered "Yes"), step S209 is performed to increment the check-out counter for the erased contents recording in the contents management table, which is described with reference to FIG. 6, and update the check-in indicator file owned by the portable device by deleting a data entry corresponding to the erased contents, which are checked in by incrementing the check-out counter, from the check-in indicator file.

The personal computer may perform the process for deleting a contents ID or other data entry corresponding to contents whose erasure from the check-in indicator file is verified. However, the personal computer may issue a data entry erasure command to the portable device, thereby causing the portable device to erase a target data entry in compliance with the received data entry erasure command.

Although not indicated in the flowchart, if, upon contents erasure, a data change process is performed on the contents use rights information retained by the portable device, the personal computer's LCM generates an updated MAC value as a new falsification check value in compliance with changed use rights information data, and supplies to the portable device the updated contents use rights information to which the updated MAC value is added.

Figure 7:
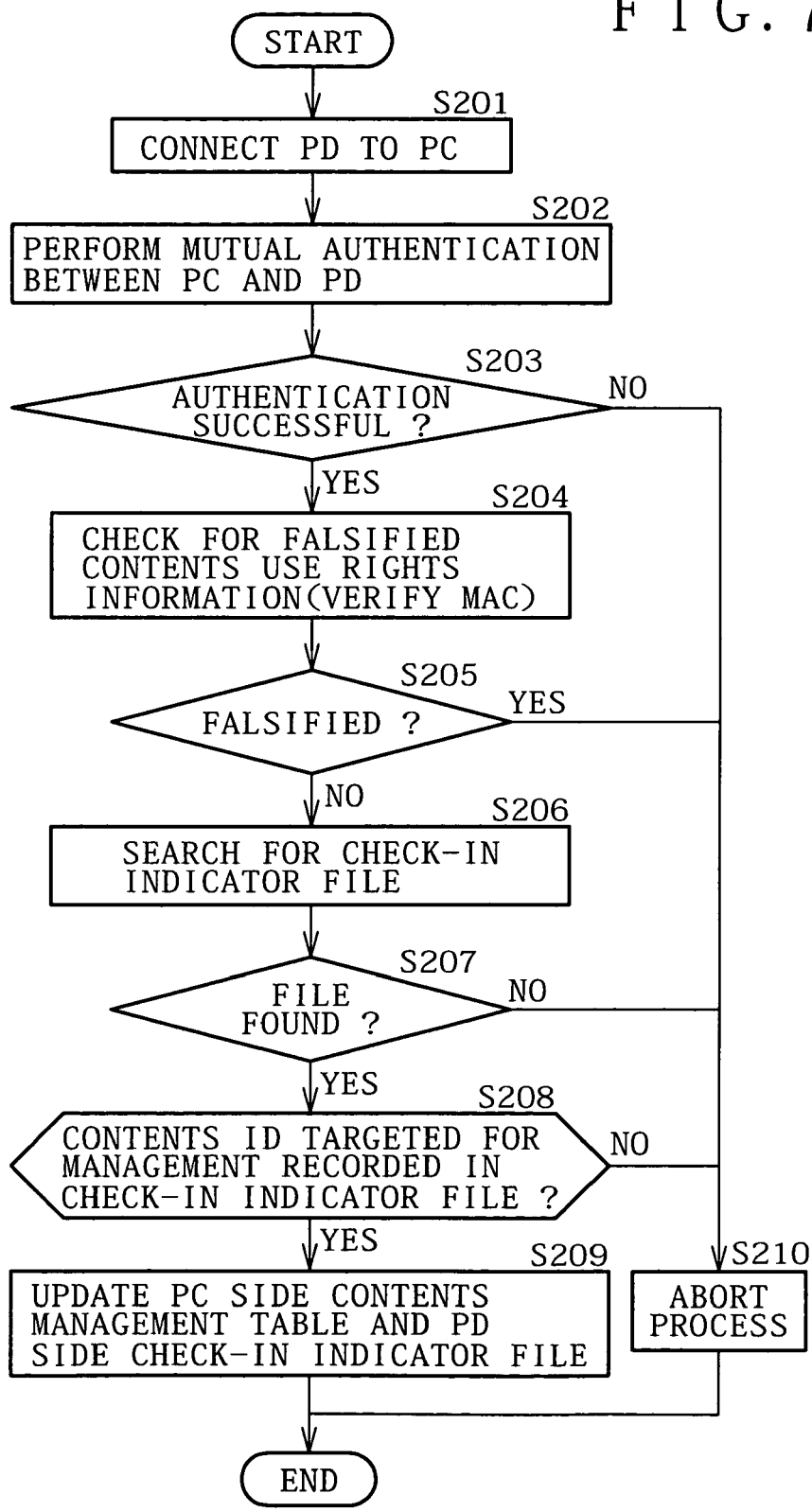
FIG. 7 is a flowchart illustrating an erased contents verification and management data update sequence that is executed between a personal computer and portable device in accordance with a check-in indicator file.

As described above, the personal computer follows the procedure shown in FIG. 7 to verify contents erased in the portable device, updates the personal computer's contents management table (performs a check-in process involving an increase in the counter value) upon erasure verification, and updates the portable device's erased contents management file (check-in indicator file), that is, deletes a data entry corresponding to contents whose erasure is verified.

In the check-in indicator file, only the information about check-out contents erased in the portable device is registered. The personal computer can compare its own contents management table (see FIG. 6) against only the information registered in the check-in indicator file, extract a data entry having a matching contents ID, and efficiently process the extracted data entry.

Therefore, even if the portable device stores a large amount of check-out contents in a flash memory or the like, it does not perform a data search process on all check-out contents. The personal computer can efficiently identify erased contents by checking only the registration information in the check-in indicator file. As a result, it is possible to efficiently perform a check-in process, that is, a check-out counter update process on the contents management table managed by the personal computer's LCM.

Figure 8:
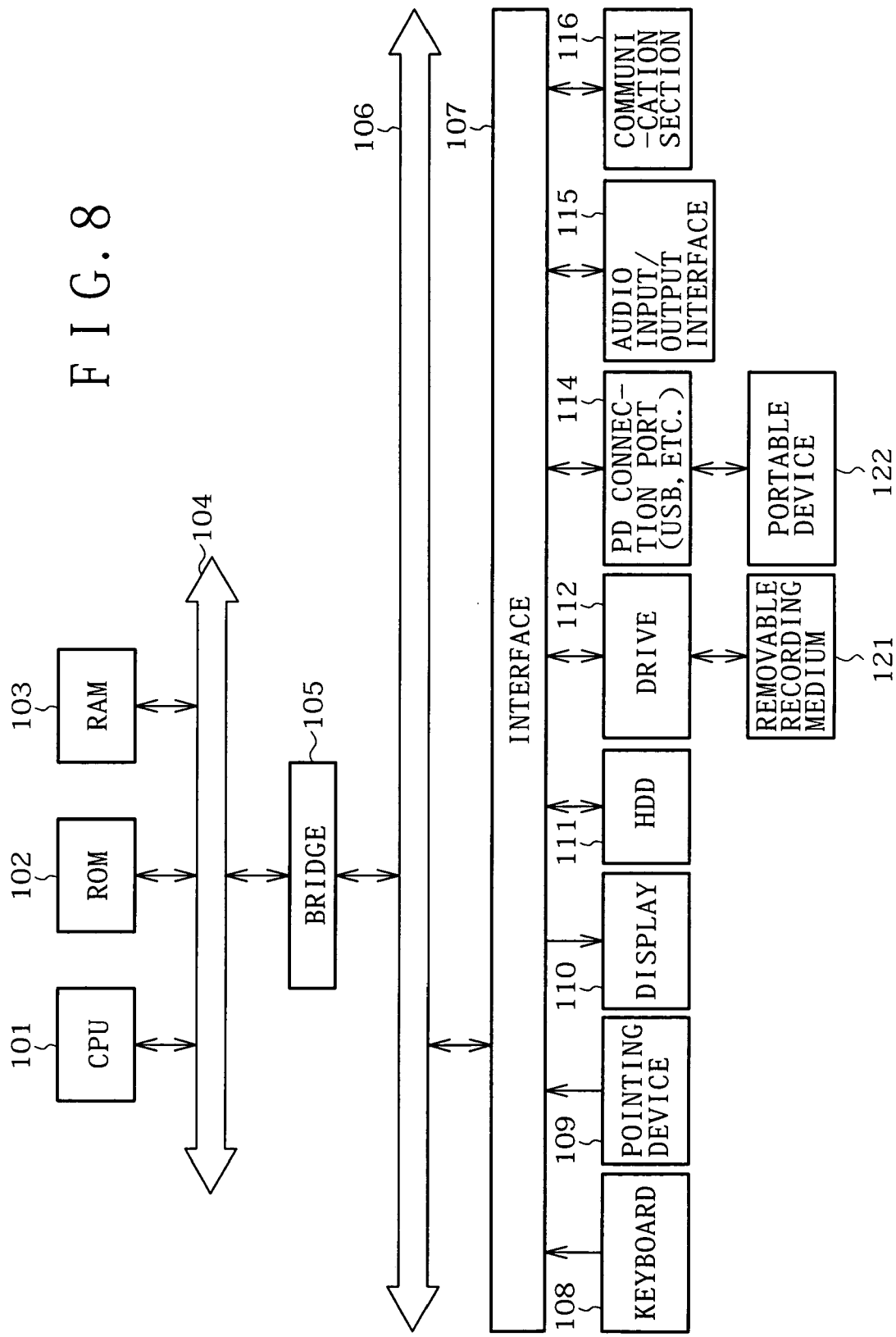
FIG. 8 illustrates a typical configuration of a personal computer or other information processing apparatus, which serves as a contents check-out source.
Figure 9:
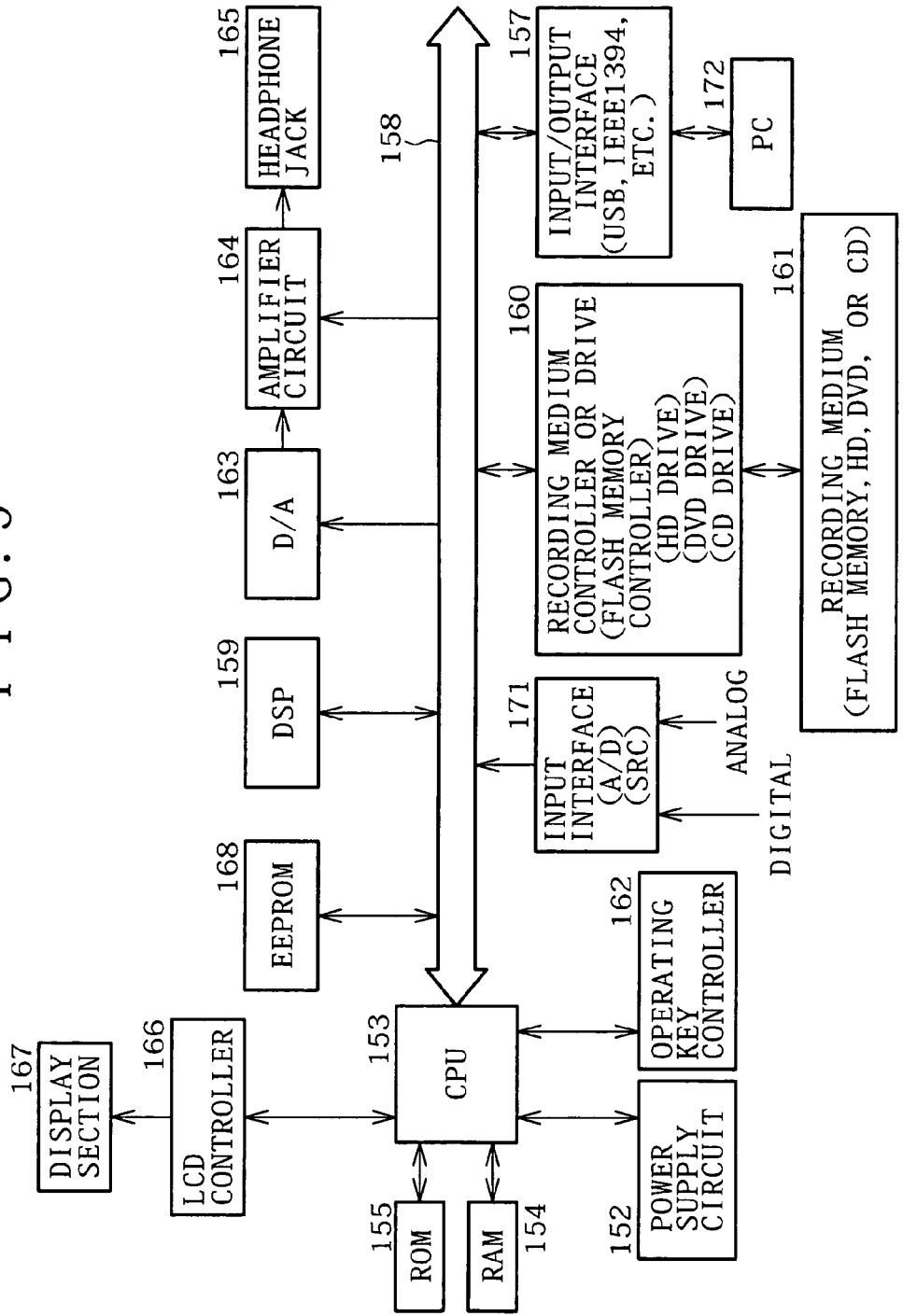
FIG. 9 illustrates a typical configuration of a portable device or other data reproducing apparatus, which serves as a contents check-out destination.

The configuration of a personal computer that serves as an information processing apparatus for performing a contents use management process, that is, a check-out/check-in process and the configuration of a portable device that serves as a data reproducing apparatus and incorporates a flash memory, small-size hard disk, optical disk, magneto-optical disk, or other storage device for storing contents will now be described with reference to FIGS. 8 and 9.

First of all, the configuration of a personal computer that serves as an information processing apparatus for performing a contents use management process, that is, a check-out/check-in process will be described with reference to FIG. 8.

A CPU (Central Processing Unit) 101 is a control section that performs processes in compliance with various computer programs, including an OS (Operating System) a contents reproduction process program, check-out/check-in process program, and other contents use management programs. The CPU 101 also performs contents encryption/decryption processes, including an encryption process based on a DES (Data Encryption Standard) or other algorithm, and a contents input/output authentication/session key sharing process in relation to a connected data reproducing apparatus (portable device).

A ROM (Read Only Memory) 102 stores, for instance, fixed data for programs and arithmetic operation parameters used by the CPU 101. The ROM 102 also stores the programs, for instance, for contents input/output authentication, contents encryption processing, and check-out/check-in processing, which are executed in relation to the above-mentioned portable device. A RAM (Random Access Memory) 103 stores, for instance, the programs to be executed by the CPU 101 and the parameters that vary with program executions. The CPU, ROM, and RAM are interconnected with a host bus 104, which is configured by, for instance, a CPU bus.

The host bus 104 is connected to an external bus 106, such as a PCI (Peripheral Component Interconnect) bus, via a bridge 105.

A keyboard 108 is operated by the user for the purpose of entering various commands into the CPU 101. A pointing device 109 is operated by the user for the purpose of designating a point on the screen of a display 110 or making a selection. The display 110 includes an LCD, CRT (Cathode Ray Tube), or the like and displays text and images to present various information. A hard disk drive (HDD) 111 drives a hard disk and records or reproduces programs and information handled by the CPU 101.

A drive 112 reads data or program recorded on a magnetic disk, optical disk, magneto-optical disk, semiconductor memory, or other removable recording medium 120. The drive 112 then supplies the read data or program to the RAM 103, which is connected via an interface 107, external bus 106, bridge 105, and host bus 104.

A PD (portable device) connection port 114 is a port for portable device connection. A USB, IEEE1394, or other interface is connected for portable device connection. The PD connection port 114 outputs the data supplied from the hard disk drive 111, CPU 101, or RAM 103, such as contents or the commands for a portable device 122 to the portable device 122 via the interface 107, external bus 106, bridge 105, host bus 104, and the like.

An audio input/output interface 115 performs an interface process for a digital or analog audio input/output having, for instance, an IEC (International Electrotechnical Commission) 60958 terminal and is connected to a speaker or other output means. A contents-specific audio output process is performed in accordance with an audio signal supplied from the input/output interface 115.

The above-mentioned keyboard 108, pointing device 109, display 110, hard disk drive 111, drive 112, PD connection port 114, and audio input/output interface 115 are connected to the interface 107. The interface 107 is connected to the CPU 101 via the external bus 106, bridge 105, and host bus 104.

A communication section 116 is connected to a network. The communication section 116 receives data supplied, for instance, from the CPU 101 or hard disk drive 111 (e.g., a contents transmission request or user registration request), stores the received data in packets in a specified format, and transmits the packets via the network. Further, the communication section 116 outputs contents or other data stored in received packets to the CPU 101, RAM 103, or hard disk drive 111 via the network.

Next, a typical configuration of a portable device, which serves as a data reproducing apparatus, will be described with reference to FIG. 9. It is assumed that a flash memory, small-size hard disk, optical disk, magneto-optical disk, or the like is used as a contents recording medium.

A power supply circuit 152 converts a supplied input voltage to an internal power having a predetermined voltage and supplies the resulting internal power to various components, including a CPU 153 and a display 167, for the purpose of driving the entire apparatus. An input/output interface 157 is an interface for connecting to a personal computer 172 that serves as a contents supply source. Therefore, the input/output interface 157 is used to establish an USB, IEEE1394, or other interface connection.

For example, when a check-out process is performed, the data transferred from the personal computer 172 is stored in packets and transferred to the portable device at a predetermined transfer rate. The data to be transferred to the portable device includes contents and incidental information such as contents use rights information.

When the portable device receives contents and contents write command from the personal computer, the CPU 153, which executes a main program that is read from a ROM 155 to a RAM 154, receives the contents write command so that a recording medium 161 writes the contents, for instance, into a flash memory or onto a hard disk, DVD, or CD. In the example shown in the figure, a flash memory, hard disk, DVD, and CD are enumerated as a recording medium 161. However, these media are enumerated as examples. The availability of at least one type of recording medium will suffice.

The process for writing data onto the recording medium 161 is performed via a recording medium controller or drive 160 appropriate for the recording medium 161. If, for instance, the employed recording medium 161 is a flash memory, a write process is performed via a flash memory controller. If a hard disk (HD) is employed as the recording medium 161, a write process is performed via a hard disk drive (HDD). The recording medium 161, such as a flash memory, hard disk, DVD, or CD, can be used with the portable device as a removable medium.

When a contents reproduction command issued by the user is supplied to the CPU 153 via an operating key controller 162, the CPU 153 causes the recording media controller or drive 160 to read contents from the recording medium 161 and transfers the read contents to a DSP (Digital Signal Processor) 159.

The DSP 159 reproduces the contents transferred from the recording medium 161. The DSP 159 has an encryption/decryption function, equalizer adjustment function (function for adjusting the gains in various frequency bands of an audio signal), and compression/decompression (encoding/decoding) function. For example, the DSP 159 encodes a digital audio signal with high efficiency for writing it onto the recording medium 161 or decrypts data read from the recording medium 161. ATRAC3, which is an improved version of ATRAC (Adaptive Transform Acoustic Coding) and adopted for use with MiniDisc, is used as a high-efficiency encoding method. MP3 or other similar encoding method may also be used.

When ATRAC3 is used, 16 quantized bits sampled at a sampling rate of 44.1 kHz encode audio data with high efficiency. When audio data is processed with ATRAC3, the minimum data unit is a sound unit (SU). 1 SU is equivalent to several hundred bytes that are compressed to contain 1024 samples (1024×16 bits×2 channels) and equivalent to a time length of approximately 23 msec. The above-mentioned high-efficiency encoding process compresses audio data to approximately $\frac{1}{10}$.

A digital-to-analog converter circuit 163 converts reproduced contents to an analog audio signal and supplies the resulting analog audio signal to an amplifier circuit 164. The amplifier circuit 164 amplifies the audio signal and supplies the amplified audio signal to a headphone, speaker, or the like via a headphone jack 165.

An input interface 171 inputs a digital signal or analog signal from an external source. When an analog signal is input, it is converted to its digital equivalent. In an analogto-digital conversion process, the input signal is converted, for instance, to a 16-quantized-bit digital audio signal at a sampling rate of 44.1 kHz. Further, the digital signal supplied from an external source is converted similarly by an SRC (sampling rate converter) to a 16-quantized-bit digital audio signal at a sampling rate of 44.1 kHz.

The CPU 153 controls an LCD controller 166 to cause the display 167 to display various information, including a reproduction mode (e.g., repetitive reproduction or introduction reproduction), equalizer adjustments (gain adjustments in various frequency bands of an audio signal), song number, song length, reproduction, stop, fast forward, rewind, sound volume, and remaining battery power.

An encryption algorithm based on the DES (Data Encryption Standard), for example, is applied to a contents encryption/decryption process that is performed by the DSP 159. The process for contents encryption is performed to protect the copyright on contents. The contents encryption process is performed during a contents transfer between the personal computer and portable device and during a contents transfer between the portable device and recording medium.

An EEPROM 168, which includes, for instance, a flash memory, stores a key that is applied to an encryption process or authentication process. The stored key is applied, for instance, to an authentication process and session key sharing process, which are performed during a contents transfer between the personal computer and portable device and a contents transfer between the portable device and recording medium, and to the encryption and decryption processes for transfer data and stored data.

While a preferred embodiment of the present invention has been described using specific terms, such description is for illustrative purpose only. It is to be understood that changes and variations may be made without departing from the spirit or scope of the appended claims.

A series of processes described above can be performed by hardware, software, or a combination of both. When the processes are to be performed by software, it is possible to install a program, in which a processing sequence is recorded, in a memory of a computer incorporated in dedicated hardware and then execute the program. Alternatively, it is possible to install the program in a general-purpose computer that can perform various processes and then execute the program.

For example, the program can be prerecorded on a hard disk, which is used as a recording medium, or in a ROM (Read Only Memory). Alternatively, the program can be stored (recorded) temporarily or permanently on a flexible disk, CD-ROM (Compact Disc Read Only Memory), MO (Magneto-Optical) disk, DVD (Digital Versatile Disc), magnetic disk, semiconductor memory, or other removable recording medium. Such removable recording media can be supplied as package software.

As an alternative to the above method in which the program is installed from a removable recording medium to a computer, the program may be transferred from a download site to the computer wirelessly or with a wiring connection via a network such as a LAN (Local Area Network) or the Internet. In this instance, the computer receives the transferred program and installs it on a built-in hard disk or other similar recording medium.

Various processes described above may be performed in the aforementioned chronological order. Alternatively, however, the processes may be performed in a parallel manner or on an individual basis depending on the processing capacity of a processing apparatus or as needed. The term "system", which has been used in the forgoing description, refers to a logical aggregate of a plurality of component apparatuses. The component apparatuses are not always within the same housing.

While a preferred embodiment of the present invention has been described using specific terms, such description is for illustrative purposes only, and it is to be understood that changes and variations may be made without departing from the spirit or scope of the following claims.

What is claimed is:

1. A data reproducing apparatus comprising:
    a communication unit for transmitting contents content to and receiving contents content from an external device;
    a storage unit for storing a plurality of contents content;
    a reproduction unit for reproducing contents the content; and
    a control unit for determining whether erased contents content is are contents content transferred from the external device, wherein
    if only the control unit determines that the erased contents content is the are contents content transferred from the external device, the control unit stores identification information about the contents content transferred from the external device as erased contents content identification information in an erased content management file, which erased content management file is presented to the external device.

2. The data reproducing apparatus according to claim 1, further comprising:
    an erasure instruction unit for issuing instructions for erasing content; and
    a control unit for determining whether content designated for erasure by said erasure instruction unit is content transferred from an external device, and, if it is determined that the designated content is content transferred from the external device, storing identification information about the content transferred from the external device as erased content identification information.

3. The data reproducing apparatus according to claim 1, wherein said erased content management file includes a content file number that is set for content transferred from said external device to the data reproducing apparatus.

4. The data reproducing apparatus according to claim 1, wherein, if a command for deleting said erased content identification information is received from said external device, said control unit deletes the erased content identification information.

5. The data reproducing apparatus according to claim 1, wherein the erased content management file stores only the erased content identification information.

6. An information processing apparatus comprising:
    a storage unit for storing, in a corresponding relationship, content, identification information about the content, and use management information indicating a use of the content;
    a transmission unit for transmitting contents content to an external device;
    a reception unit for receiving erased contents content identification information about contents content erased by said external device, wherein the erased content identification is acquired from an erased content management file stored in said external device; and
    an information processing unit for causing, if only said reception unit receives said erased content identification information, said storage unit to retrieve identification information stored in said information processing apparatus that matches the erased contents content identification information, and updating use management data corresponding to the retrieved identification information.

7. The information processing apparatus according to claim 6, wherein, if an authentication process is successfully performed in relation to said external device, said information processing unit compares said erased content identification information against identification information stored in said information processing apparatus, and updates the use management data about content indicated by identification information that matches said erased content identification information.

8. The information processing apparatus according to claim 6, wherein said information processing unit further deletes said erased content identification information in said external device.

9. The information processing apparatus according to claim 6, wherein said use management information is a counter value that represents a number of transfers that can be made from said information processing apparatus to said external device; and
wherein said information processing unit, if said reception unit receives said erased content identification information, causes said storage unit to retrieve identification information that matches the erased content identification information, and increments a use management information counter value corresponding to the retrieved identification information.

10. A contents content management system comprising:
an information processing apparatus for managing of contents content; and
a data reproducing apparatus for receiving contents content from the information processing apparatus; wherein said data reproducing apparatus comprises:
a communication unit for transmitting contents content to and receiving contents content from said information processing apparatus,
a storage unit for storing content a plurality of contents, and
a control unit for determining whether erased contents content is content transferred from said information processing apparatus, wherein:
if only the control unit determines that the erased contents content is the are contents content transferred from said information processing apparatus, storing identification information about the content transferred from the information processing apparatus as erased content identification information in an erased content management file, the erased content management file is presented to the information processing apparatus; and
wherein said information processing apparatus comprises:
a storage unit for storing, in a corresponding relationship, content a plurality of contents, identification information about each contents the content, and use management information indicating a use of the content.

11. The content management system according to claim 10, wherein said information processing unit of said information processing apparatus further instructs said data reproducing apparatus to delete said erased content identification information; and
wherein said control unit of said data reproducing apparatus deletes said erased content identification information in compliance with a command for deleting the erased content identification information.

12. An information processing method for use in an information processing apparatus capable of receiving contents content transferred from an external device, the information processing method comprising steps of:
erasing contents content;
determining whether the erased contents content is content transferred from the external device; and
if only the control unit determines that the erased content is the content transferred from the external device outside, storing identification information about the contents content transferred from the external device as erased contents content identification information in an erased content management file, the erased content management being presented to the external device.

13. The information processing method according to claim 12, wherein the erased content management file stores only the erased content identification information.

14. An information processing method for use in an information processing apparatus capable of managing a use of contents content and communicating with an external device, the information processing method comprising the steps of:
storing, in a corresponding relationship, content identification information about each contents the content, and use management information indicating a use of each contents the content;
receiving erased contents content identification information about contents content erased in said external device from said external device, wherein said erased content identification information is acquired from an erased content management file stored in said external device;
if only said erased contents content identification information is received, retrieving identification information stored in said information processing apparatus that matches the erased contents content identification information; and
updating use management information corresponding to the retrieved identification information.

15. The computer-readable medium according to claim 14, wherein the erased content management file stores only the erased content identification information.

16. A computer-readable medium encoded with a computer program for use in an information processing apparatus capable of receiving contents content transferred from an external device, the computer program comprising computer-executable instructions for executing steps of:
erasing contents content; determining whether erased contents content is content are contents transferred from an external device; and
if only the control unit determines that the erased contents content is the content are contents transferred from the external device outside, storing identification information about the contents content transferred from the external device as erased contents content identification information in an erased content management file, the erased content management file being presented to the external device.

17. A computer-readable medium encoded with a computer program for use in an information processing apparatus capable of managing a use of contents content and communicating with an external device, the computer program comprising computer-executable instructions for executing steps of:
storing, in a corresponding relationship, content identification information about the content, and use management information indicating a use of the content;
receiving erased contents content identification information about contents content erased in said external device from said external device, wherein said erased content identification information is acquired from an erased content management file stored in said external device;

if only said erased content identification information is received, retrieving identification information stored in said information processing apparatus that matches the erased content identification information; and updating use management information corresponding to the retrieved identification information.

* * * * *